Figure 1:
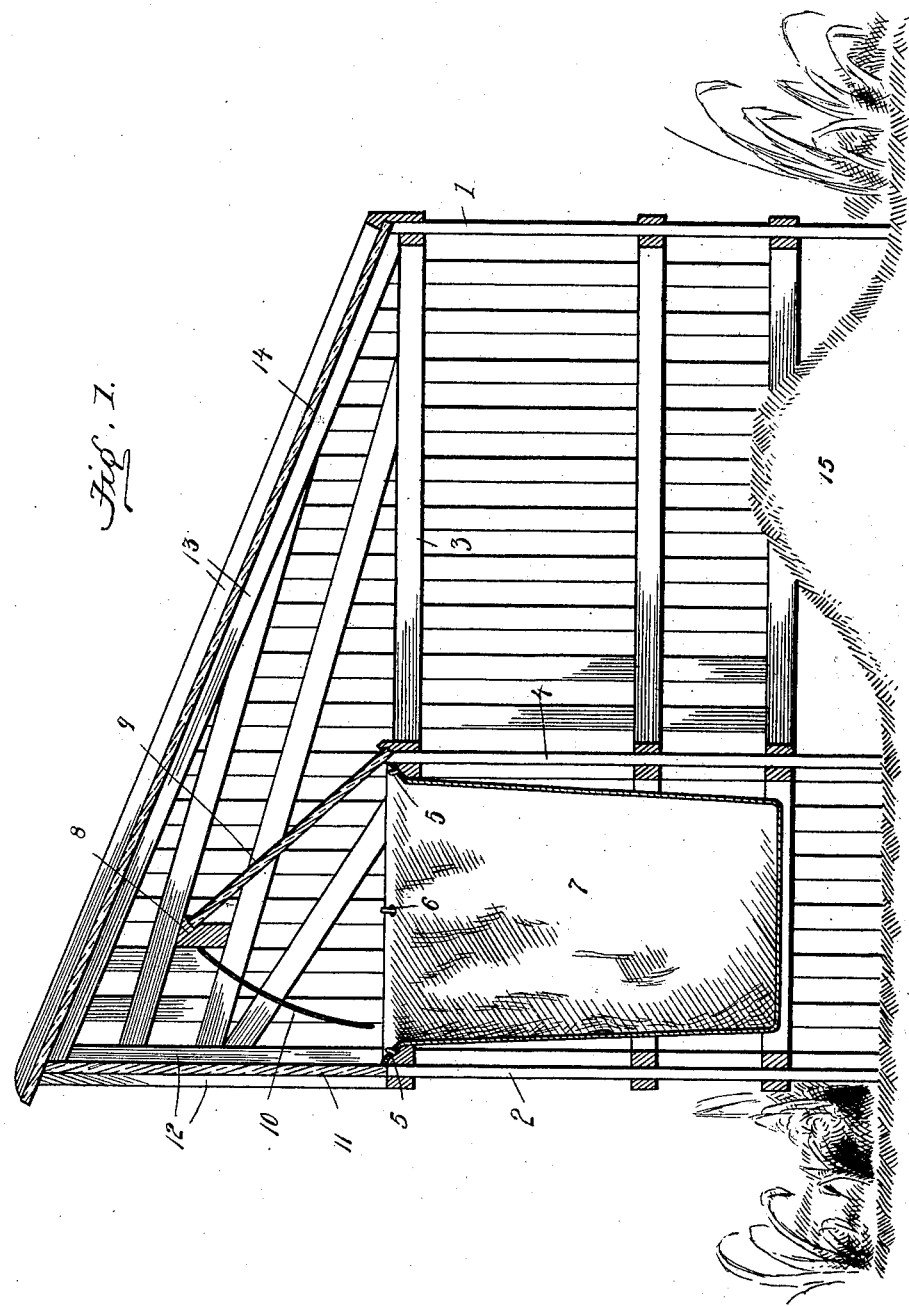

No. 686,800. Patented Nov. 19, 1901.
J. B. BARRY.
BIRD TRAP.
(Application filed Oct. 4, 1900. Renewed Sept. 28, 1901.)
(No Model.) 2 Sheets—Sheet 1.

Witnesses
Inventor
J. B. Barry.
By Victor J. Evans. Attorney

No. 686,800. Patented Nov. 19, 1901.
J. B. BARRY.
BIRD TRAP.
(Application filed Oct. 4, 1900. Renewed Sept. 28, 1901.)
(No Model.) 2 Sheets—Sheet 2.
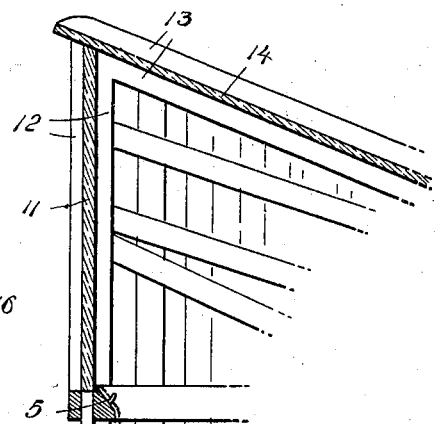
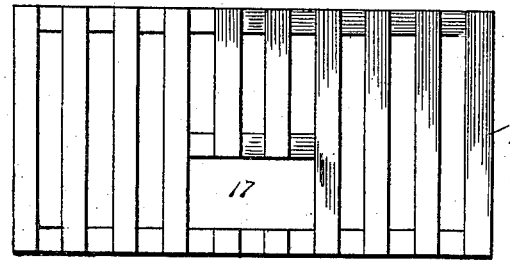
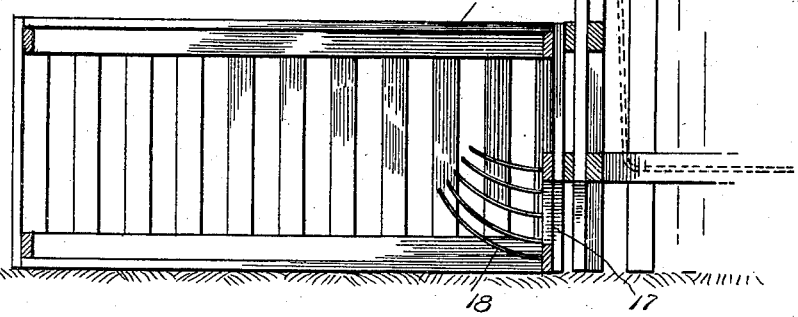
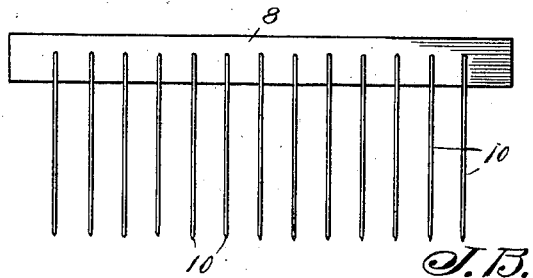
Witnesses
Inventor
J. B. Barry,
By Victor J. Evans Attorney

UNITED STATES PATENT OFFICE.

JAMES B. BARRY, OF WALNUT SPRINGS, TEXAS.

BIRD-TRAP.

SPECIFICATION forming part of Letters Patent No. 686,800, dated November 19, 1901.

Application filed October 4, 1900. Renewed September 28, 1901. Serial No. 76,928. (No model.)

*To all whom it may concern:*

Be it known that I, JAMES BUCKNER BARRY, a citizen of the United States, residing at Walnut Springs, in the county of Bosque and State of Texas, have invented new and useful Improvements in Bird-Traps, of which the following is a specification.

This invention relates to new and useful improvements in traps; and its primary object is to provide a device of this character adapted to entrap birds, thereby protecting rice and wheat fields, orchards, gardens, &c.

A further object is to provide means whereby a bird may readily pass into the trap, but cannot escape therefrom.

Another object is to provide a novel arrangement of glass whereby the bird will be attracted to the bag or other receptacle adapted to receive it.

To these ends the invention consists in providing a frame having a vertical partition at one end thereof, between which and the free end of the frame is suspended a bag adapted to receive the birds. Glass is arranged at the top of the vertical partition and at an inclination thereto and prongs are provided at a point adjacent to the upper edge of this glass and extend downward over the top of the bag. These prongs are formed of spring metal, so that the same will readily spring inward when a weight is placed thereon. Glass is also arranged at suitable points within the frame, so as to attract the bird toward the prongs arranged above the bag.

The invention also consists in certain features of construction and combination of parts, which will be hereinafter fully described and claimed, and illustrated in the accompanying drawings, showing the preferred form of my invention, and in which—

Figure 1 is a longitudinal section through the complete trap. Fig. 2 is a similar view showing a modified form. Fig. 3 is a front elevation of the case used in Fig. 2. Fig. 4 is a front elevation of the perch and the prongs secured thereto.

Referring to said figures by numerals of reference, 1 and 2 are the front and rear end walls, respectively, of the frame, said frame being preferably formed of vertical slats suitably secured to horizontally-extending strips 3. A vertical partition 4 is arranged within the frame 1 and extends upward therein. Projecting from the upper end of this partition are upwardly-curved studs 5, and similar studs are also arranged upon the end 2 of the frame and upon that portion of the sides thereof which is between the partition and the end 2. These studs are adapted to project into perforations 6, formed at the upper edge of a bag 7, of any suitable material, said bag hanging between the partition and the end 2. A cross-strip 8 is arranged transversely within the frame at a point substantially in vertical alinement with the center of the bag 7, and this strip receives one edge of a glass 9, the opposite edge of which is seated within the top of the partition 4. It is obvious, therefore, that this glass is held in an inclined position above the bag. Secured to the opposite edge of the cross-strip 8 are downwardly-curved prongs 10, which are preferably formed of a spring metal and the free ends of which terminate at a point adjacent to the edge of the bag 7 farthest removed from the partition 4.

That portion of the end 2 of the casing which is above the bag 7 is provided with a glass 11, which extends transversely thereof and is slidably mounted between vertical guides 12, secured to the sides of the frame. Parallel inclined guides 13 extend from a point adjacent to the upper edge of the glass 11 down to the top of the end 1 of the frame, and slidably mounted between these guides is a glass 14, which extends the full length and breadth of the device. The end 1 and that portion of the sides which is between the partition 4 and said end are cut away for a suitable distance from the bottom thereof, so as to permit a bird to pass readily into the frame.

The trap is preferably placed over a mound of dirt 15, so that the bird, upon entering the frame, attracted by suitable bait, will walk to a point above the opening where it entered. As the glass top 14 makes it appear that there is an unobstructed outlet through the top of the trap, the bird in attempting to leave the trap will be attracted thereto, but upon contacting with said glass will be thrown forward and downward into close proximity to the glass 9. The bird in endeavoring to escape therethrough will pass upward until the perch 8 is reached, and will then endeavor to leave the trap in the direction of the glass 11. When, however, it contacts with said glass, it will be thrown downward upon the curved prongs 10, and the weight thereof will force the prongs inward and the bird will drop into the bag 7. The prongs will then swing backward to their normal position. Should the bird endeavor to escape from the bag, it will fly toward the glass 9 instead of toward the prongs 10, as said glass as well as the glass 14 makes it appear that there is an unobstructed passage in that direction. When it is desired to remove the birds from the bag, it is merely necessary to slide the glass 14 upward from between its guides 13, and the prongs 10 can then be pressed inward and the bag readily detached from the studs 5 or the birds grasped by hand and removed therefrom.

In Fig. 2 I have shown a modified form. In said figure I dispense with the bag and employ a cage 16, having an opening 17 therein, adapted to register with an opening in the wall of the cage. Upwardly-curved prongs 18 are arranged within the cage about the opening, and these prevent the return of the bird after the same has once passed therebetween.

In the foregoing description I have shown the preferred form of my invention; but I do not limit myself thereto, as I am aware that modifications may be made therein without departing from the spirit or sacrificing the advantages thereof, and I therefore reserve the right to make all such changes as fairly fall within the scope of my invention.

Having thus fully described my invention, what I claim as new, and desire to secure by Letters Patent, is—

1. The combination with a frame having an inlet; of a receptacle; a perch above the receptacle; curved spring-prongs extending from the perch and over the receptacle; and a transparent portion to the frame adapted to attract a bird to the receptacle.

2. The combination with a frame having an inlet; of a receptacle; downwardly-curved spring-prongs arranged above said receptacle; a transparent light arranged at an inclination above the receptacle; a perch between said light and the downwardly-curved prongs; and transparent portions to the casing adapted to attract a bird toward the perch and into the receptacle.

3. The combination with a frame having an inlet; of a receptacle; a transversely-extending perch within the frame above the receptacle; a transparent glass secured to the perch and extending over one edge of the receptacle; spring-prongs secured to the perch and extending to a point adjacent to the opposite edge of the receptacle; and glass arranged within one end and the top of the frame and adapted to attract a bird to the perch and into the receptacle.

4. The combination with a frame having an inlet; of a vertically-extending partition within the frame; a receptacle at one side of said partition; a perch extending transversely of the frame at a point above the receptacle; a transparent glass secured at opposite edges to said perch and vertical partition respectively; downwardly-extending spring-prongs secured to the perch; and transparent glass arranged at the end of the frame adjacent to the perch and within the top of said frame.

5. The combination with a frame having an inlet; of a vertical partition within the frame; studs extending from said partition and from one end of the frame and the sides thereof; a bag detachably secured to said studs; a perch extending transversely of the frame at a point above the bag; an inclined glass secured at opposite edges to said perch and the vertical partition respectively; curved spring-prongs secured to the perch and extending to a point adjacent to one edge of the bag; inclined parallel guides at the upper edges of the sides of the frame; an inclined glass slidably mounted between said guides and extending the length and breadth of the frame; vertical parallel guides upon the sides of the frame at the end adjacent to the bag; and a glass slidably mounted between said guides.

In testimony whereof I affix my signature in presence of two witnesses.

JAMES B. BARRY.

Witnesses:
JOSEPH T. OLSON,
T. H. STOUT.